(12) United States Patent
Sekine

(10) Patent No.: US 7,764,192 B2
(45) Date of Patent: Jul. 27, 2010

(54) TRAVELING SAFETY DEVICE FOR VEHICLE

(75) Inventor: Hiroshi Sekine, Shioya-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 313 days.

(21) Appl. No.: 11/826,868

(22) Filed: Jul. 19, 2007

(65) Prior Publication Data

US 2008/0024266 A1 Jan. 31, 2008

(30) Foreign Application Priority Data

Jul. 27, 2006 (JP) ............................. 2006-204414

(51) Int. Cl.
*G08G 1/09* (2006.01)

(52) U.S. Cl. .................... 340/905; 340/438; 701/45; 701/72

(58) Field of Classification Search ............. 340/425.5, 340/905, 995.13, 438–439, 937; 701/45, 701/70, 72

See application file for complete search history.

(56) References Cited

U.S. PATENT DOCUMENTS

| | | | | |
|---|---|---|---|---|
| 5,146,219 A | * | 9/1992 | Zechnall | 340/995.24 |
| 5,315,295 A | * | 5/1994 | Fujii | 340/936 |
| 6,141,617 A | * | 10/2000 | Matsuda et al. | 701/72 |
| 7,378,986 B2 | * | 5/2008 | Eckstein et al. | 340/902 |
| 2001/0020902 A1 | * | 9/2001 | Tamura | 340/905 |
| 2002/0161510 A1 | * | 10/2002 | Matsuura | 701/200 |
| 2004/0008128 A1 | * | 1/2004 | Linkohr et al. | 340/988 |

FOREIGN PATENT DOCUMENTS

JP 2001-108450 4/2001

\* cited by examiner

*Primary Examiner*—Brent Swarthout
(74) *Attorney, Agent, or Firm*—Arent Fox LLP

(57) ABSTRACT

A traveling safety device for a vehicle of the present invention includes a storage device, a present vehicle position detecting device, a vehicle state detecting device, a curve recognizing device, a proper vehicle state setting device, a comparing device, an operating device, an improper operation determining device that determines whether or not the operation of the operating device for a recognized curve is improper operation, an improper operation curve storage device that stores the recognized curve for which the operation of the operation device is determined to be improper operation by the improper operation determining device, and a suppressing device that suppresses the operation of the operating device for the recognized curve stored by the improper operation curve storage device.

6 Claims, 9 Drawing Sheets

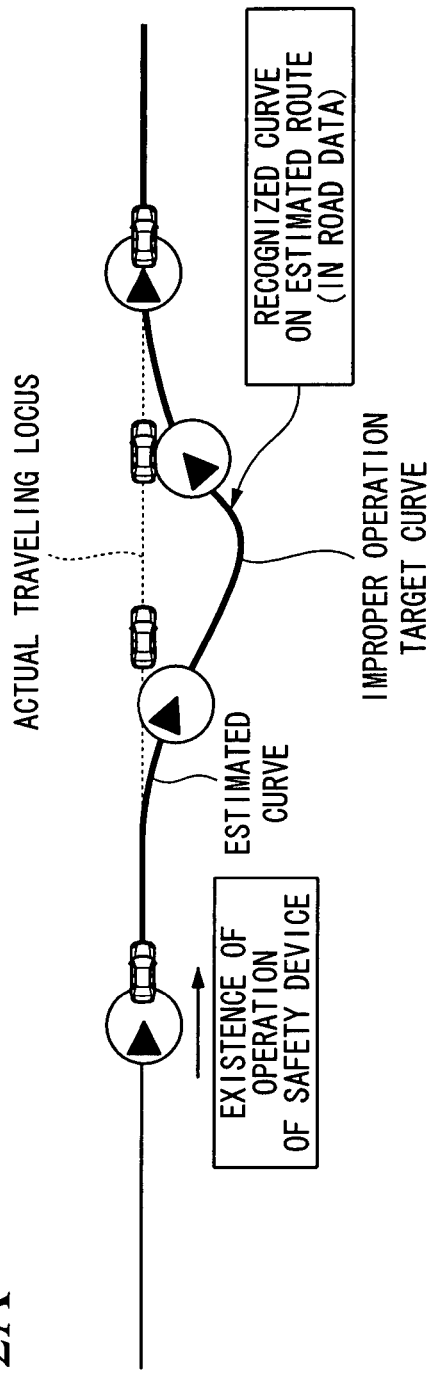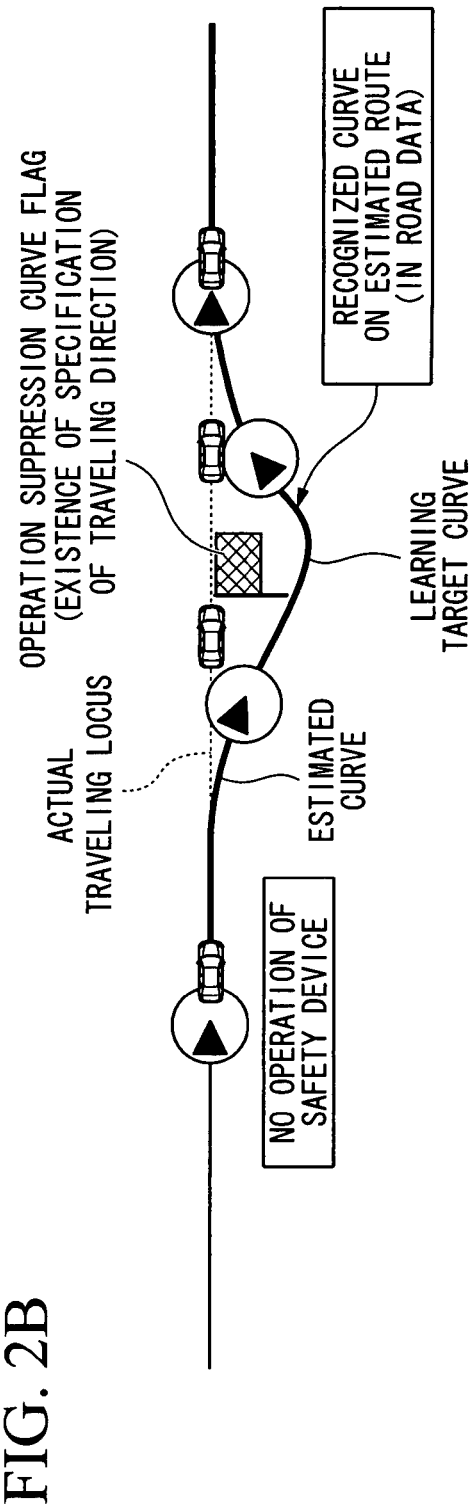
FIG. 2A
FIG. 2B

TRAVELING SAFETY DEVICE FOR VEHICLE

BACKGROUND OF THE INVENTION

Priority is claimed on Japanese Patent Application No. 2006-204414, filed Jul. 27, 2006, and the contents of that are incorporated herein by reference.

FIELD OF THE INVENTION

The present invention relates to a traveling safety device for a vehicle.

DESCRIPTION OF THE RELATED ART

A traveling safety device for a vehicle that estimates a route of a present vehicle based on road data, and operates a safety device (for example, a brake assist device, an automatic brake system, etc.) when the present vehicle enter a curve recognized on the estimated route is known.

In this traveling safety device for a vehicle, the safety device may operate improperly for a curve in the following cases:

(1) When the road shape of a recognized curve in road data is wrong.

(2) When an estimated route is wrong, an actually selected road (actual selection road) has no curve, but the wrong estimated road has a curve, and the safety device operates for the curve.

(3) When mismatching is made if a present vehicle is traveling on a road that is different from an actual route, and the safety device operates for a curve on the mismatched road data.

When there is such improper operation of the safety device, it is considered that a device (hereinafter referred to as "improper operation learning device") that learns the improper operation so that similar improper operation may not take place from the next time.

Further, for example, a navigation system in which road data, such as the position and shape of a road, is stored in a storage unit, a traveling locus is detected with traveling of a vehicle based on, for example, a turning angle detected by a gyro sensor or traveling time, the road shape in the road data is compared with the shape of the traveling locus, and if there exists any difference between the shapes, the road data of the storage unit is modified, is known (for example, refer to Japanese Unexamined Patent Application, First Publication No. 2001-108450).

However, in order to enhance the accuracy and reliability of the aforementioned improper operation learning device, clarification of factors of the improper operation or event confirmation by a predetermined frequency of repetitions is required. Thus, a system becomes complicated.

Further, modifying or adding the road data stored in the storage unit according to the traveling locus like the aforementioned navigation system is not easy in respect of network data management.

The present invention was made in view of the above-mentioned circumstances and has an object of providing a traveling safety device for a vehicle that makes it possible to simply and easily learn improper operation of a safety device.

SUMMARY OF THE INVENTION

The present invention employed the followings in order to achieve the above object.

That is, a traveling safety device for a vehicle of the present invention includes: a storage device that stores a road data; a present vehicle position detecting device that detects a position of a present vehicle; a vehicle state detecting device that detects a vehicle state of the present vehicle; a curve recognizing device that recognizes a shape of a curve that exists in a traveling direction of the present vehicle based on the road data stored by the storage device; a proper vehicle state setting device that sets, based on the shape of a recognized curve that is a curve recognized by the curve recognizing device, a proper vehicle state where the vehicle is able to properly pass through the recognized curve; a comparing device that compares the vehicle state detected by the vehicle state detecting device with the proper vehicle state set by the proper vehicle state setting device; an operating device that operates a safety device provided in the present vehicle if the vehicle state of the present vehicle is not the proper vehicle state based on a comparison result by the comparing device; an improper operation determining device that determines whether or not the operation of the operating device for the recognized curve is improper operation; an improper operation curve storage device that stores the recognized curve for which the operation of the operation device is determined to be improper operation by the improper operation determining device; and a suppressing device that suppresses the operation of the operating device for the recognized curve stored by the improper operation curve storage device.

According to the traveling safety device for a vehicle, when the improper operation determining device has determined that the operation of the operating device for a recognized curve is improper operation, the operation of the safety device by the operating device can be suppressed if the same curve is recognized on the next estimated route.

That is, when the improper operation determining device has determined that the operation of the operating device for a recognized curve that became a target for the operation of the safety device is improper operation, the operation of the safety device by the operating device can be suppressed if the same curve is recognized on the next estimated route. Moreover, improper operation of the operating device can be simply and easily learned without performing troublesome processing, such as clarifying factors of improper operation of the operating device or making additions or changes of road data.

It may be arranged such that the traveling safety device for a vehicle further includes: a route estimating device that estimates a route of the present vehicle based on at least the road data stored in the storage device; and an estimated route passage determining device that determines whether or not the route estimated by the route estimating device corresponds with an actual traveling road, wherein the improper operation determining device determines that the operation of the operating device is improper operation if it is determined that the route estimated by the estimated route passage determining device does not correspond with the actual traveling road, after the operation of the operating device.

In this case, when the operating device has been improperly operated due to an error of an estimated route, the operation of the safety device by the operating device can be suppressed if the same curve is recognized on the next estimated route.

It may be arranged such that the traveling safety device for a vehicle further includes an actual curve detecting device that detects a curve on the actual road from a vehicle traveling state, wherein the improper operation determining device determines that the operation of the operating device is improper operation if it is determined that the route estimated by the estimated route passage determining device corresponds with an actual traveling road, and any curve is not detected on the actual road by the actual curve detecting device, after the operation of the operating device.

In this case, when the operating device has been improperly operated due to an error of the road shape of a recognized curve in road data, the operation of the safety device by the operating device can be suppressed if the same curve is recognized on the next estimated route.

It may be arranged such that the traveling safety device for a vehicle further includes: a matching determining device that determines whether or not the present vehicle is traveling on a road corresponding to the road data based on the road data stored in the storage device and an output from the present vehicle position detecting device, wherein the improper operation determining device determines that the operation of the operating device is improper operation if the matching determining device has determined that the present vehicle is not traveling on the road corresponding to the road data, after the operation of the operating device.

In this case, when the operating device has been improperly operated due to an error of an estimated route, the operation of the safety device by the operating device can be suppressed if the same curve is recognized on the next estimated route.

It may be arranged such that the improper operation determining device does not perform improper operation determination for the recognized curve if the matching determining device has determined that the present vehicle is traveling on a road corresponding to road data that is different from an estimated route, after the operation of the operating device.

In this case, if the repeatability of improper operation of the operating device is scarce, improper operation for a recognized curve can be prevented from being determined.

It may be arranged such that: the improper operation curve storage device additionally stores a traveling direction in which the safety device has been operated; and the suppressing device suppresses the operation of the operating device if the stored traveling direction, and the traveling direction of the present vehicle are the same.

In this case, if a traveling direction is different, the operation of the safety device by the operating device can be prevented from being suppressed. For example, if a recognized curve exists in the course of a hill, the hill becomes an uphill in one traveling direction, but becomes a downhill in the other traveling direction. As a result, the operation conditions of the safety device also change according to the uphill and downhill even in the same recognized curve.

It may be arranged such that if the present vehicle has passed through a curve stored in the improper operation curve storage device, an improper operation memory for the curve stored in the improper operation curve storage device is erased.

In this case, a problem caused by the fact that a curve stored as an improper operation curve is permanently stored as an improper operation curve can be solved. That is, even if the present vehicle has once passed through a curve stored as an improper operation curve, a problem that the operation of the safety device continues being suppressed can be solved.

BRIEF DESCRIPTION OF THE DRAWINGS

FIGS. 2A and 2B are views illustrating a case where the safety device has been improperly operated due to an error of a recognized curve in road data.

DETAILED DESCRIPTION OF THE INVENTION

Hereinafter, one embodiment of a traveling safety device for a vehicle according to the present invention will be described with reference to FIGS. 1 to 9.

Figure 1:
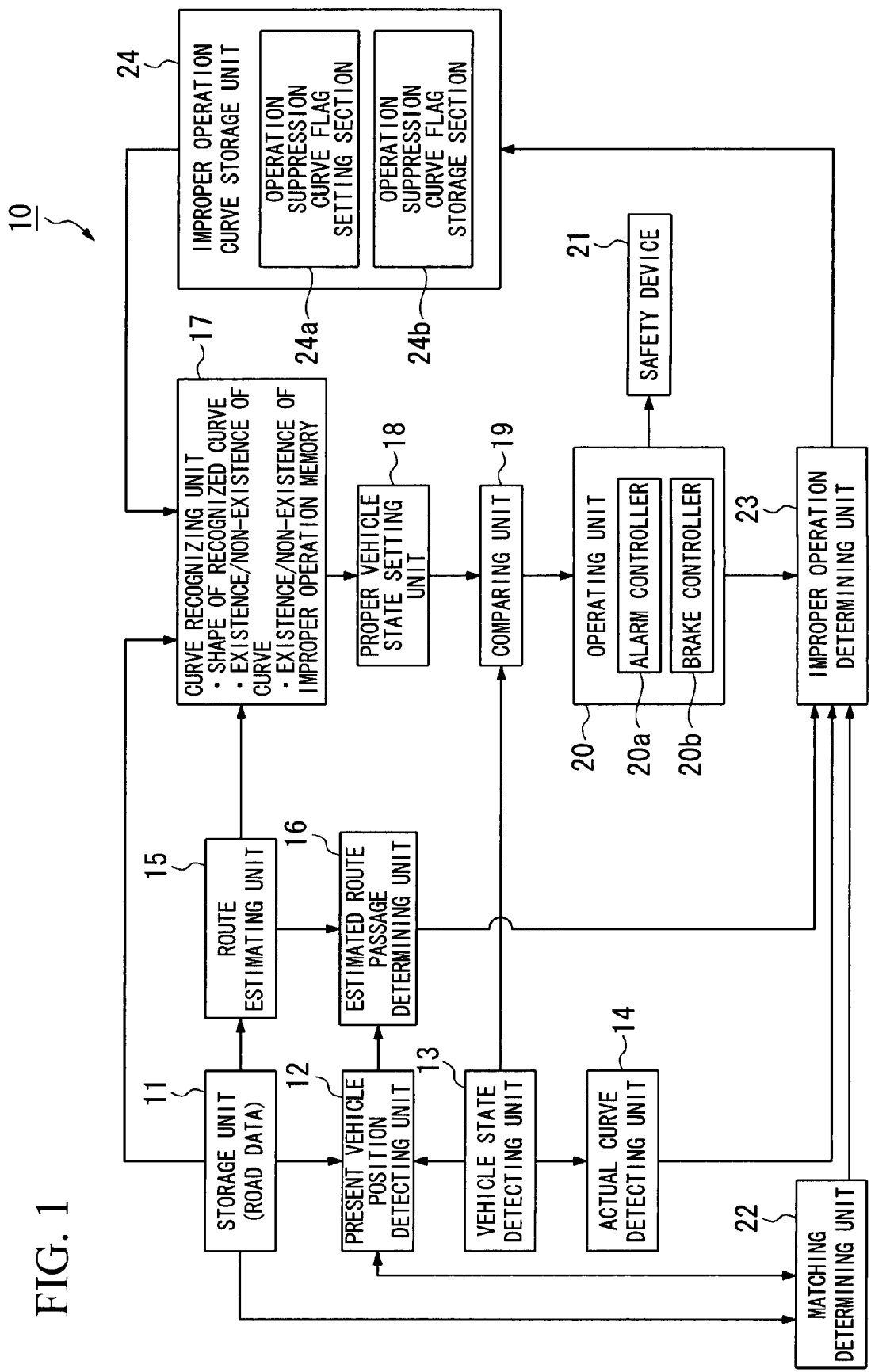
FIG. 1 is a functional block diagram of a traveling safety device for a vehicle according to one embodiment of the present invention.

As shown in FIG. 1, a traveling safety device 10 for a vehicle of the present embodiment is applied to a so-called curve entering brake assist system, and includes, for example, a storage unit (storage device) 11, a present vehicle position detecting unit (present vehicle position detecting device) 12, a vehicle state detecting unit (vehicle state detecting device) 13, an actual curve detecting unit (actual curve detecting device) 14, a route estimating unit (route estimating device) 15, an estimated route passage determining unit (estimated route passage determining device) 16, a curve recognizing unit (curve recognizing device) 17, a proper vehicle state setting unit (proper vehicle state setting device) 18, a comparing unit (comparing device) 19, an operating unit (operating device) 20, a safety device 21, a matching determining unit 22 (matching determining device), an improper operation determining unit (improper operation determining device) 23, and an improper operation curve storage unit (improper operation curve storage device) 24.

The storage unit 11 stores node information and curve information related to a road as road data. The node information is, for example, data of coordinate points for grasping a road shape. The curve information is composed of, for example, information related to the curvature of a curve (for example, the curvature or radius R, and polarity of a curve), and information related to the depth of a curve (for example, a turning angle θ or a curve length that is required for passage through a curve), in addition to the starting point and ending point of a curve that is set on a link (that is, a line that connects individual nodes together). Further, the storage unit 11 stores road attribute data, such as passage difficulty (for example, road width) or road type (national road, prefectural road, etc.), etc.

The present vehicle position detecting unit 12 calculates the current position of the present vehicle by calculation processing of autonomous navigation based on a positioning signal, such as a signal from a GPS (Global Positioning System) for measuring the position of a vehicle, for example, using a satellite, or a signal from a DGPS (Differential Global Positioning System) for correcting the error of the GPS signal, for example, using a proper base station to improve positioning accuracy, or a detection signal output from the vehicle state detecting unit 13 as will be described below, and outputs the calculated current position to the estimated route passage determining unit 16.

Moreover, the present vehicle position detecting unit 12 performs map matching based on the calculated current position of the present vehicle, and the road data acquired from the storage unit 11, and corrects the result of position estimation by autonomous navigation.

The vehicle state detecting unit 13 includes, for example, a vehicle speed sensor or wheel speed sensor that detects the current speed of the present vehicle, a lateral acceleration sensor that detects the lateral acceleration (lateral G) of the present vehicle, a gyro sensor or yaw rate sensor that detects the direction of the present vehicle in a horizontal plane or the angle of inclination of the present vehicle with respect to a vertical direction (for example, the angle of inclination of the longitudinal axis of the present vehicle with respect to the vertical direction, a yaw angle that is the rotation angle of the gravity center of the vehicle around the vertical axis, etc.), and the amount of change (for example, yaw rate, etc.) of the angle of inclination, a steering angle sensor that detects a steering angle (the direction and magnitude of a steering angle input by a driver) and an actual steering angle (wheel turning angle) according to the steering angle, a steering torque sensor that detects a steering torque, etc. Also, the vehicle state detecting unit outputs individual detection signals to the present vehicle position detecting unit 12, the actual curve detecting unit 14, and the comparing unit 19.

The actual curve detecting unit 14, for example, calculates the traveling locus of the present vehicle based on the yaw rate, traveling time, etc. of the present vehicle that are detected by the vehicle state detecting unit 13, detects the shape of an actual curve from this traveling locus, and outputs the detected shape to the improper operation determining unit 23.

The route estimating unit 15 calculates the estimated route of the present vehicle based on the current position of the present vehicle output from the present vehicle position detecting unit 12, and the road data stored in the storage unit 11, and outputs the calculated estimated route to the estimated route passage determining unit 16 and the curve recognizing unit 17. For example, if there are two fork roads on a route of the present vehicle, a road whose passage difficulty is relatively lower, a road whose road type is at a relatively high level, or a road whose road type is equivalent is selected as an estimated route.

The estimated route passage determining unit 16 determines whether or not the present vehicle has passed through the estimated route (on-route state) based on the history of the current position of the present vehicle calculated by the present vehicle position detecting unit 12, and the estimated route calculated by the route estimating unit 15. That is, the estimated route passage determining unit estimates whether or not the estimated route and an actual route coincide with each other. The estimated route passage determining unit 16 outputs the determination result to the improper operation determining unit 23.

The curve recognizing unit 17 acquires the road data of the estimated route calculated by the route estimating unit 15 from the storage unit 11, and recognizes a curve that exists on a predetermined range of a road ahead in a traveling direction from the current position of the present vehicle based on this road data. For example, the curve recognizing unit 17 recognizes the shape of a curve (the shape of a recognized curve) based on coordinate points for grasping node information, i.e., road shape, and link information that is a line that connects individual nodes together.

Further, the curve recognizing unit 17 recognizes whether or not the recognized curve is a curve with an improper operation memory based on an output from an operation suppression curve flag storage section 24b of the improper operation curve storage unit 24.

Moreover, the curve recognizing unit 17 detects the starting point position and shape of a curve (for example, the radius R or curvature of a curve, a turning angle θ, the curve length of the curve, depth of the curve, etc.) that have been recognized ahead in the traveling direction of the present vehicle, based on the curve information included in the road data acquired from the storage unit 11, and outputs them to the proper vehicle state setting unit 18.

The proper vehicle state setting unit 18 calculates the vehicle speed (proper passage vehicle speed) of a vehicle at which the vehicle can properly pass through the recognized curve shape, based on the recognized curve shape recognized by the curve recognizing unit 17, and outputs it to the comparing unit 19.

In addition, the proper vehicle state setting unit 18 can calculate a lateral acceleration (proper lateral acceleration) that is permitted when the present vehicle properly passes through a recognized curve, with respect to an acceleration (lateral acceleration) generated in the lateral direction of the present vehicle during passage through a curve, and can calculate a proper vehicle speed from this proper lateral acceleration.

Further, the proper vehicle state setting unit 18 calculates a distance (hereinafter referred to as "deceleration-required distance") that is required when deceleration is properly made from the current vehicle speed to the proper passage vehicle speed.

The comparing unit 19 compares the current vehicle state (vehicle speed, etc.) of the present vehicle detected by the vehicle state detecting unit 13 with the proper vehicle state (proper vehicle speed, etc.) set by the proper vehicle state setting unit 18, and outputs the comparison result to the operating unit 20.

The operating unit 20 controls the operation of a deceleration control unit composed of an alarm controller 20a, an engine controller (not shown), and a transmission controller (not shown), and a brake controller 20b, based on the comparison result in the comparing unit 19 and the improper operation memory recognized in the curve recognizing unit 17. For example, if there is no improper operation memory for a recognized curve, and from the comparison result in the comparing unit 19, the present vehicle is not in a proper vehicle state like a state where a detected current vehicle speed is higher than a proper vehicle speed, an alarm of the safety device 21 is operated via the alarm controller 20, thereby raising the driver's caution, or a brake actuator of the safety device 21 is operated via the brake controller 20b, thereby automatically decelerating the present vehicle. Further, if there is an improper operation memory for a recognized curve, the operating unit 20 is does not operate the safety device 21 irrespective of a comparison result of the comparing unit 19.

The matching determining unit 22 determines whether or not the present vehicle is in a state (road matching state) of being traveling on a road corresponding to the road data, based on the current position of the present vehicle detected by the present vehicle position detecting unit 12, and the road data stored in the storage unit 11.

The improper operation determining unit 23 determines whether or not the operation of the safety device 21 for a recognized curve is improper, based on an actual curve shape detected by the actual curve detecting unit 14, the determination result of the estimated route passage determining unit 16, the existence/nonexistence of the operation of the safety device 21 by the operating unit 20, and the determination result of the matching determining unit 22, and outputs the determination result to the improper operation curve storage unit 24.

The improper operation curve storage unit 24 is provided with an operation suppression curve flag setting section 24a and an operation suppression curve flag storage section 24b. The operation suppression curve flag setting section 24a sets an operation suppression curve flag to the recognized curve, if the improper operation determining unit 23 has determined an improper operation. The operation suppression curve flag storage section 24b matches the operation suppression curve flag set by the operation suppression curve flag setting section 24a with a corresponding curve, specifies and stores a traveling direction, and outputs the curve to the curve recognizing unit 17 as a curve with an improper operation memory. Further, the improper operation curve storage unit 24 erases the memory of setting of the operation suppression curve flag for this curve, if the curve set by the operation suppression curve flag has satisfied a predetermined condition.

Next, as for the improper operation determining unit 23, a case where it is estimated that the operation of the safety device 21 by the operating unit 20 is an improper operation, and an operation suppression curve flag is set and stored in the recognized curve, a case where the memory of setting of an operation suppression curve flag is erased, and a case where determination of whether or not the operation of the safety device 21 is improper is not executed will be concretely described with reference to FIGS. 2A to 7B.

FIG. 2A shows a case where the present vehicle is traveling on an estimated route (on-route state), but a road shape in the road data for a recognized curve on the estimated route is wrong, and this recognized curve has a shape approximate to a straight line on an actual road. In such a case, when the operating unit 20 has operated the safety device 21 for the recognized curve on the estimated route, after the operation of the safety device 21, the estimated route passage determining unit 16 determines that the estimated route and the actual route coincide with each other (on-route state), but any curve is not detected on the actual road. In this case, it is determined that the above operation is an improper operation. Then, as shown in FIG. 2B, after a traveling direction is specified for this recognized curve, an operation suppression curve flag is set, and is stored in the operation suppression curve flag storage section 24b.

In addition, the reason why a traveling direction is specified when an operation suppression curve flag is set and stored for the recognized curve is as follows. That is, for example, if a recognized curve exists in the course of a hill, the hill becomes an uphill in one traveling direction, but becomes a downhill in the other traveling direction. As a result, the operation conditions of the safety device 21 also change according to the uphill and downhill even in the same recognized curve.

Also, as shown in FIG. 2B, if this curve for which the operation suppression curve flag has been set is recognized on the next estimated route in the same traveling direction of the present vehicle, the operation of the operating unit 20 for this recognized curve is suppressed (prohibited), and even if the present vehicle goes straight on a route that does not exist in road data without passing through this recognized curve, the operation of the safety device 21 is suppressed (prohibited).

Figure 3A:
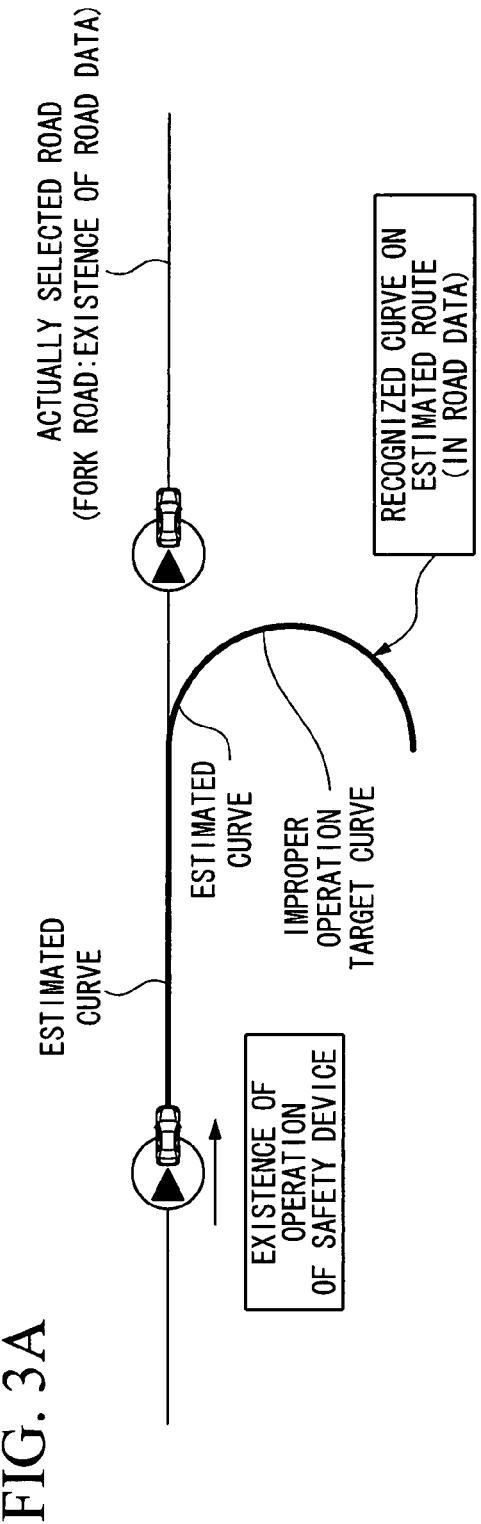
FIGS. 3A and 3B are views (Case 1) illustrating a case where the safety device has been improperly operated due to an error of an estimated route.

FIG. 3A shows a case (road matching state) where the present vehicle is traveling on an estimated route (on-route state) before a recognized curve on the estimated route, but the vehicle advances on a fork road that exists in the road data without passing through the recognized curve. In such a case, when the operating unit 20 has operated the safety device 21 for the recognized curve on the estimated route, after the operation of the safety device 21, the matching determining unit 16 determines that the present vehicle is in a road matching state, but the estimated route passage determining unit 16 determines that the estimated route and the actual route do not coincide with each other (off-route state). In this case, it is determined that the above operation is an improper operation. Then, as shown in FIG. 3B, after a traveling direction is specified for this recognized curve, an operation suppression curve flag is set, and is stored in the operation suppression curve flag storage section 24b.

Figure 3B:
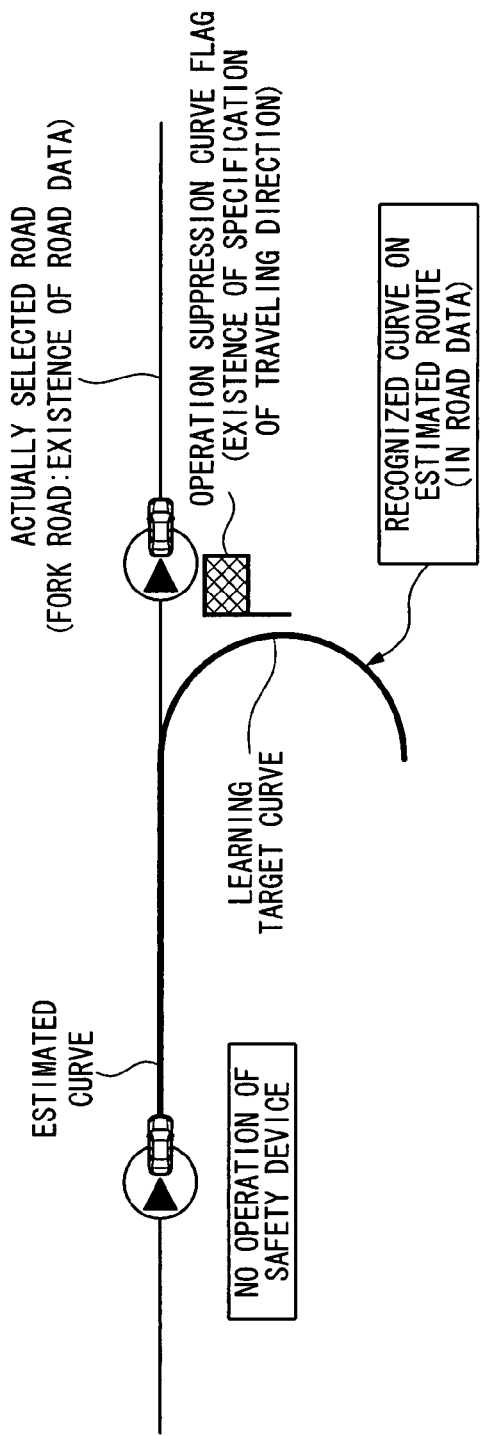

Also, as shown in FIG. 3B, if this curve for which the operation suppression curve flag has been set is recognized on the next estimated route in the same traveling direction of the present vehicle, the operation of the operating unit 20 for this recognized curve is suppressed (prohibited), and even if the present vehicle advances on a fork road that exists in road data without passing through this recognized curve, the operation of the safety device 21 is suppressed (prohibited).

Figure 4:
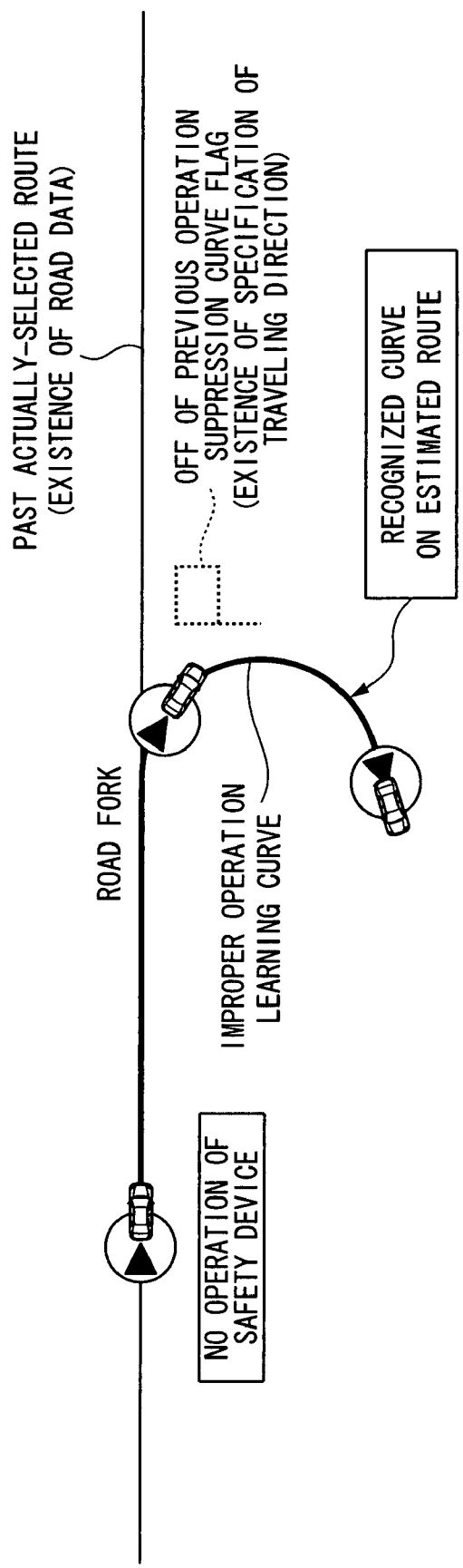
FIG. 4 is a view (Case 1) illustrating a case where an improper operation memory for a curve is erased.

However, as shown in FIG. 4, if the present vehicle travels in a traveling direction in which this recognized curve is specified after the operation suppression curve flag is set, in order to cancel the setting of the operation suppression curve flag for this curve, the memory of the setting of the operation suppression curve flag for this curve is erased from the improper operation curve flag storage section 24b. Accordingly, a problem caused by the fact that a curve stored as an improper operation curve is permanently stored as an improper operation curve can be solved.

That is, even if the present vehicle has once passed through a curve stored as an improper operation curve, a problem that the operation of the safety device 21 continues being suppressed (prohibited) can be solved.

Figure 5A:
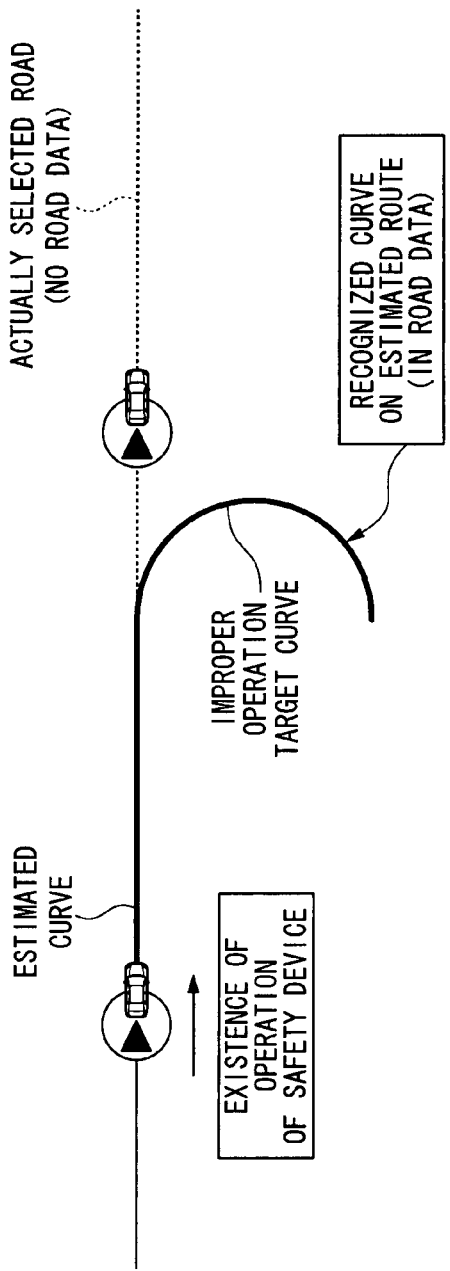
FIGS. 5A and 5B are views (Case 2) illustrating a case where the safety device has been improperly operated due to an error of an estimated route.

FIG. 5A shows a case (off-road state) where the present vehicle is traveling on an estimated route (on-route state) before a recognized curve on the estimated route, but the vehicle advances on a route that does not exist in the road data without passing through the recognized curve. In such a case, when the operating unit 20 has operated the safety device 21 for the recognized curve on the estimated route, after the operation of the safety device 21, the estimated route passage determining unit 16 determines that the estimated route and the actual route do not coincide with each other (off-route state) and the matching determining unit 16 determines that the present vehicle is in an off-road state. In this case, it is determined that the above operation is an improper operation. Then, as shown in FIG. 5B, after a traveling direction is specified for this recognized curve, an operation suppression curve flag is set, and is stored in the operation suppression curve flag storage section 24b.

Figure 5B:
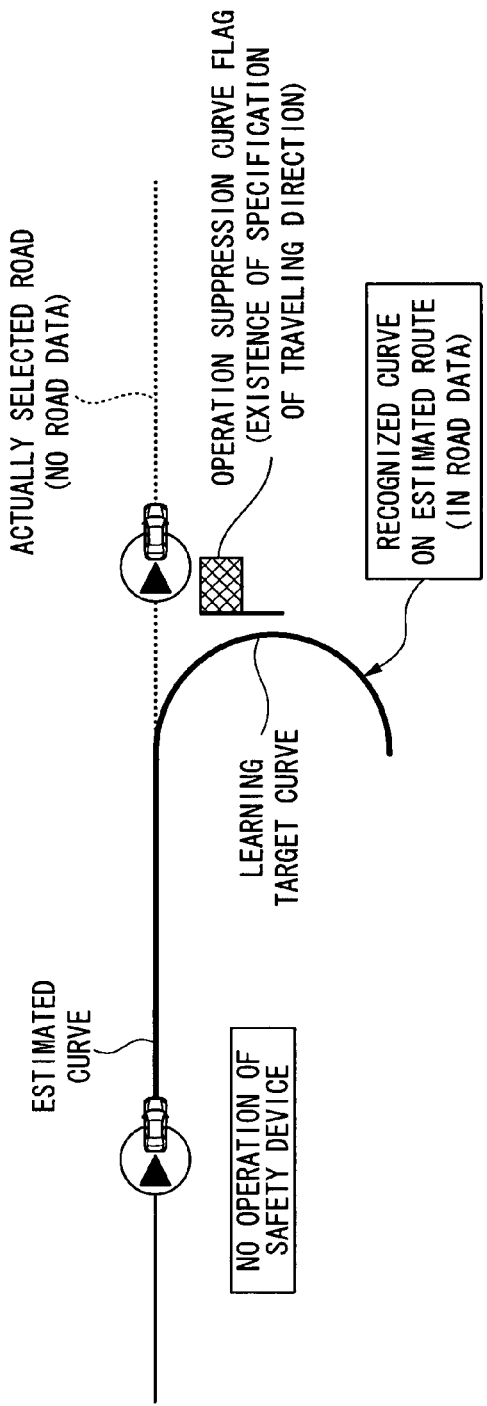

Also, as shown in FIG. 5B, if this curve for which the operation suppression curve flag has been set is recognized on the next estimated route in the same traveling direction of the present vehicle, the operation of the operating unit 20 for this recognized curve is suppressed (prohibited), and even if the present vehicle advances on a route that does not exist in road data without passing through this recognized curve, the operation of the safety device 21 is suppressed (prohibited).

Figure 6:
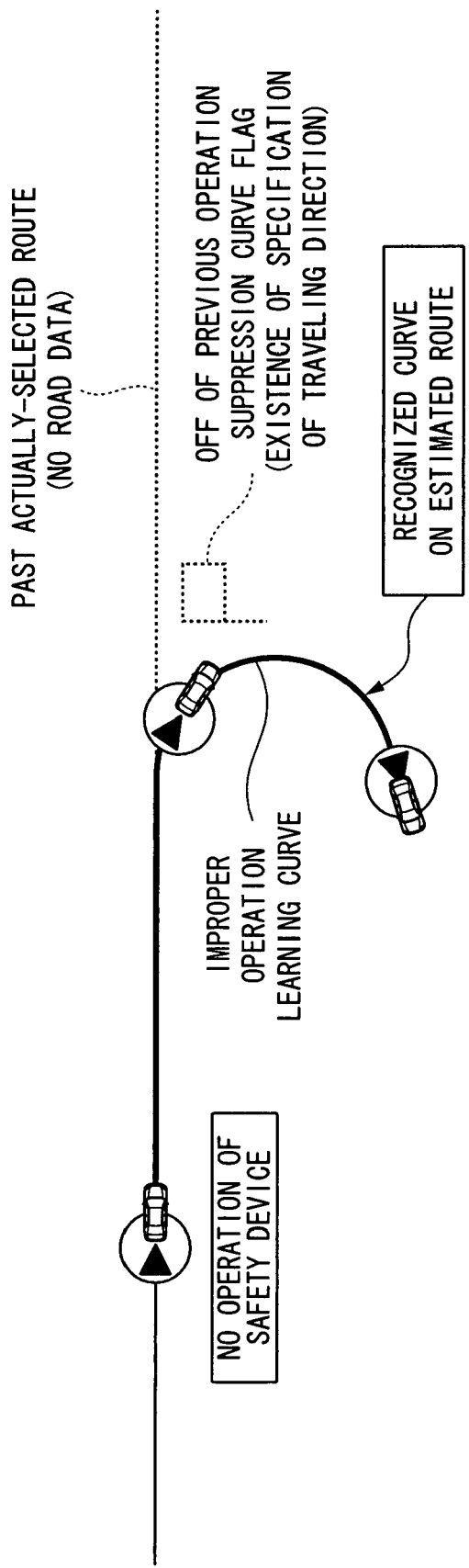
FIG. 6 is a view (Case 2) illustrating a case where an improper operation memory for a curve is erased.

However, as shown in FIG. 6, if the present vehicle travels in a traveling direction in which this recognized curve is specified after the operation suppression curve flag is set, in order to cancel the setting of the operation suppression curve flag for this curve, the memory of the setting of the operation suppression curve flag for this curve is erased from the improper operation curve flag storage section 24b.

Figure 7A:
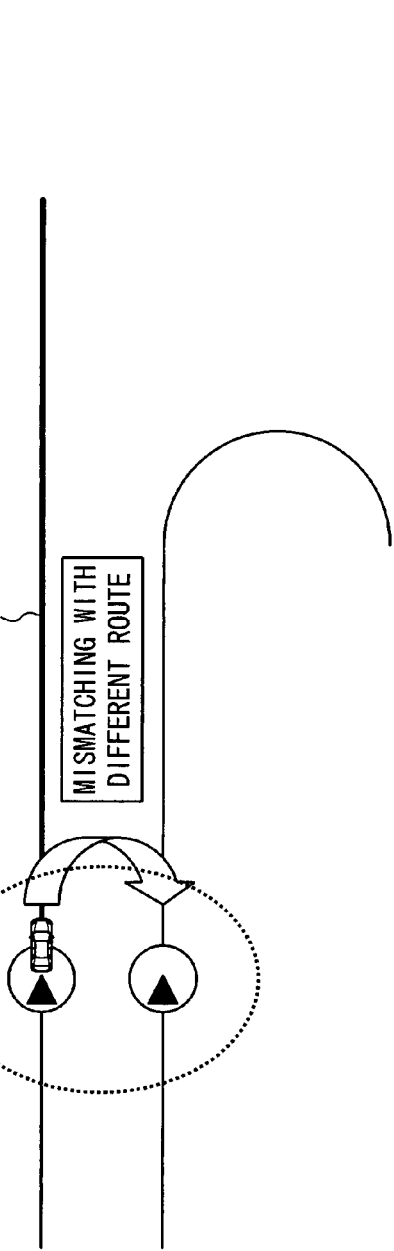
FIGS. 7A and 7B are views (Case 1) illustrating a case where the safety device has been improperly operated due to road mismatching.
Figure 7B:
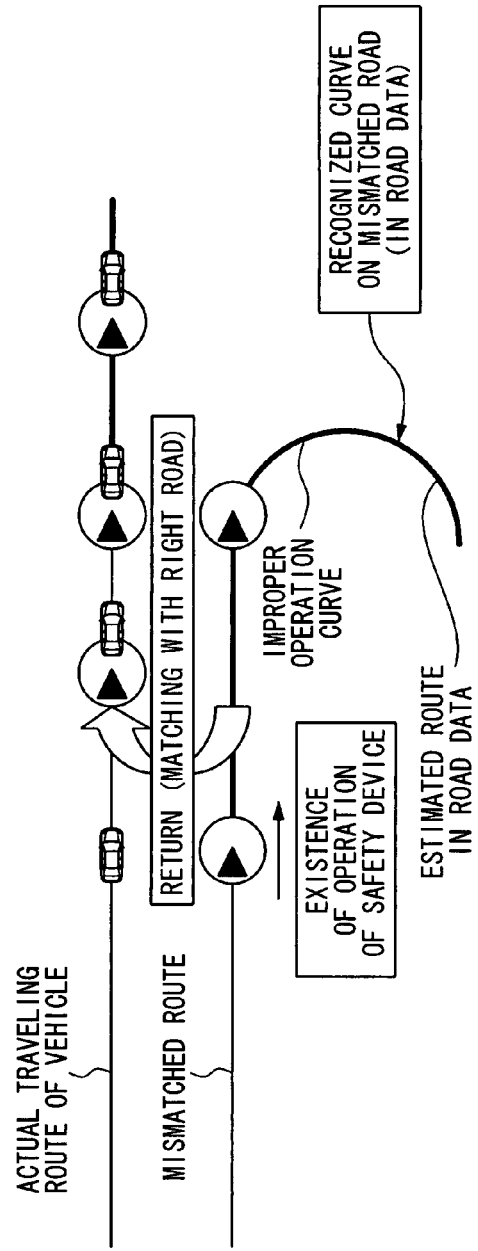

FIGS. 7A and 7B show a case where the present vehicle is traveling on a road corresponding to road data (road mismatching) that is different from an estimated route, and thus the operating unit 20 has operated the safety device 21 for a recognized curve on the estimated route.

As shown in FIG. 7A, whether the present vehicle is traveling the estimated route or whether the present vehicle is traveling on the road corresponding to road data that is different from the estimated route is unclear before the recognized curve on the estimated route. Thereafter, for example, as shown in FIG. 7B, the curve recognizing unit 17 recognizes the curve on the estimated route, and the operating unit 20 operates the safety device 21 for this recognized curve. Thereafter, if it is detected that the estimated route is wrong from the current position of the present vehicle (road mismatching), the route estimating unit 15 is matched with a right road (change of a matching road). In this case, after the operation of the safety device 21, the estimated route passage determining unit 16 determines that the estimated route and the actual route do not coincide with each other (off-route state) and the matching determining unit 22 determines that the present vehicle is in a road matching state. Also, the operation of changing a matching road is executed immediately after the operation of the safety device 21. In this way, if the matching road is changed immediately after the operation of the safety device 21, it is believed that the reliability of the present vehicle position detection by the present vehicle position detecting unit 12 at the time of the operation of the safety device 21 or at the present time is doubtful, and it can be said that repeatability is scarce. Thus, suppose that determination of whether or not the operation of the safety device 21 is improper is not executed.

Figure 8:
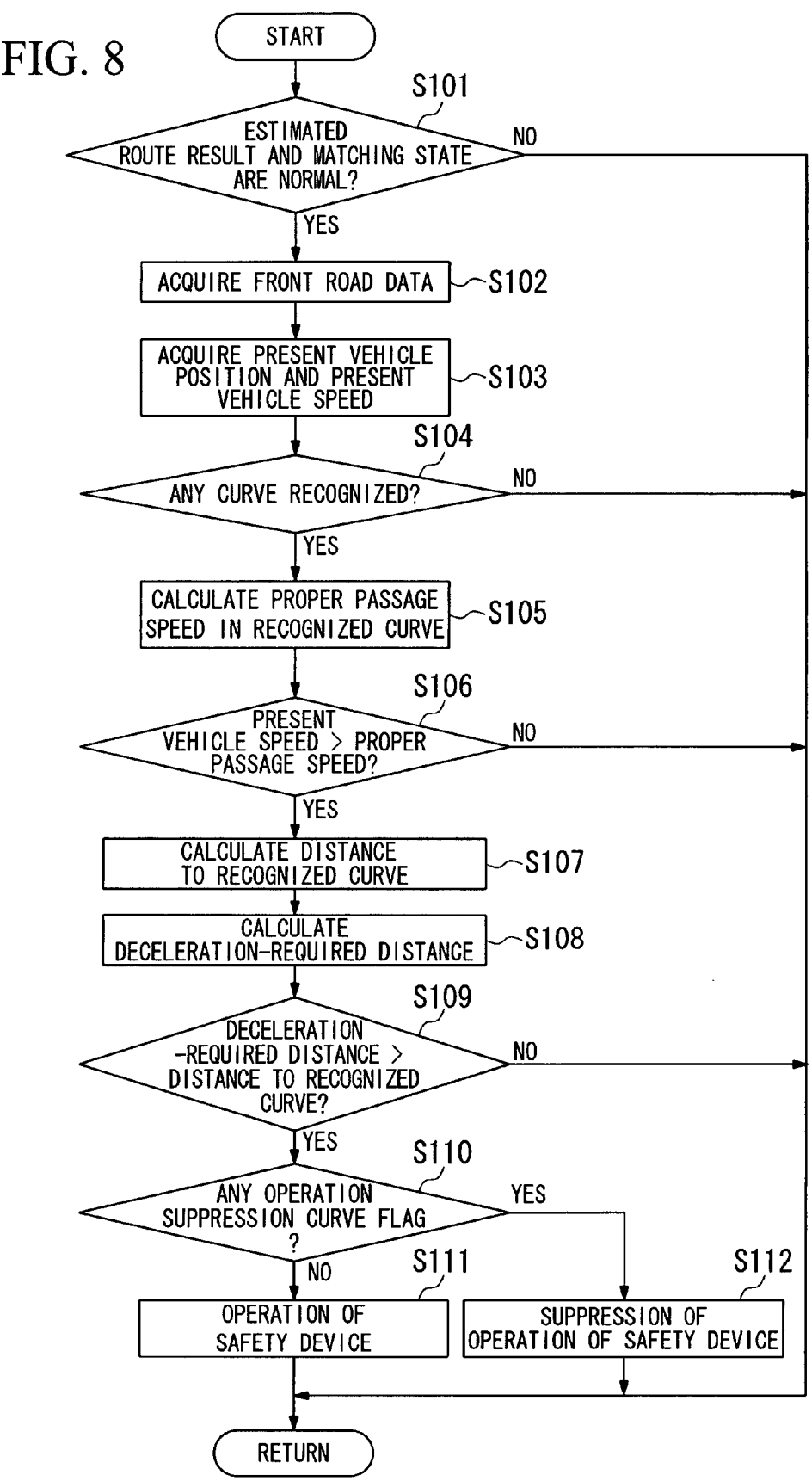
FIG. 8 is a flow chart of the operation determination processing of brake assist control in the traveling safety device for a vehicle.

Next, the operation of the traveling safety device 10 for a vehicle in the present embodiment, especially the operation determination processing for the brake assist controller 22 in the operating unit 18 will be described according to the flow chart of FIG. 8. In addition, an operation determination processing routine shown in the flow chart of FIG. 8 is repeatedly executed at every fixed time interval by a control device (not shown).

First, in Step S101, it is determined whether or not an estimated route result is normal (on-route state), and a matching state is normal (road matching state).

If the determination result in Step S101 is "NO," execution of this routine is once completed without operating the safety device 21.

If the determination result in Step S101 is "YES," the process proceeds to Step S102 where the road data ahead in the traveling direction in an estimated route of the present vehicle is acquired from the road data stored in the storage unit 11.

Next, the process proceeds to Step S103 where the current position and vehicle speed of the present vehicle are acquired.

Next, the process proceeds to Step S104 where it is determined whether or not a curve has been recognized ahead in the traveling direction based on the road data.

If the determination result in Step S104 is "NO" (no curve recognition), execution of this routine is once completed without operating the safety device 21.

On the other hand, if the determination result in Step S104 is "YES" (curve recognition), the process proceeds to Step S105 where a proper passage vehicle speed in the recognized curve is calculated.

Next, the process proceeds to Step S106 where it is determined whether or not the vehicle speed of the present vehicle is larger than the proper passage vehicle speed calculated in Step S105.

If the determination result in Step S106 is "NO" (present vehicle speed≦proper passage speed), execution of this routine is once completed without operating the safety device 21.

If the determination result in Step S106 is "YES" (present vehicle speed>proper passage speed), the distance from the current position of the present vehicle to the recognized curve is calculated.

Next, the process proceeds to Step S108 where the distance that is required for deceleration of the present vehicle to a proper passage vehicle speed, i.e., deceleration-required distance, is calculated.

Next, the process proceeds to Step S109 where it is determined whether or not the distance from the current position of the present vehicle to the recognized curve is smaller than the deceleration-required distance.

If the determination result in Step S109 is "NO" (greater than or equal to the deceleration-required distance), execution of this routine is once completed without operating the safety device 21.

If the determination result in Step S109 is "YES" (smaller than the deceleration-required distance), the process proceeds to Step S110 where it is determined whether there is any improper operation memory for the recognized curve (in other words, whether or not setting of an operation suppression curve flag is stored).

If the determination result in Step S110 is "NO" (no improper operation memory), the process proceeds to Step S111 where the safety device 21 is operated by the operating unit 20, and then execution of this routine is once completed.

If the determination result in Step S110 is "YES" (improper operation memory), the process proceeds to Step S112 where the operation of the safety device 21 is suppressed (the operation of the safety device 21 is prohibited in the present embodiment), and then execution of this routine is completed.

In the present embodiment, a suppressing device that suppresses the operation of the operating unit 20 (operating device) is realized by executing processing of Steps S110 and S112.

Figure 9:
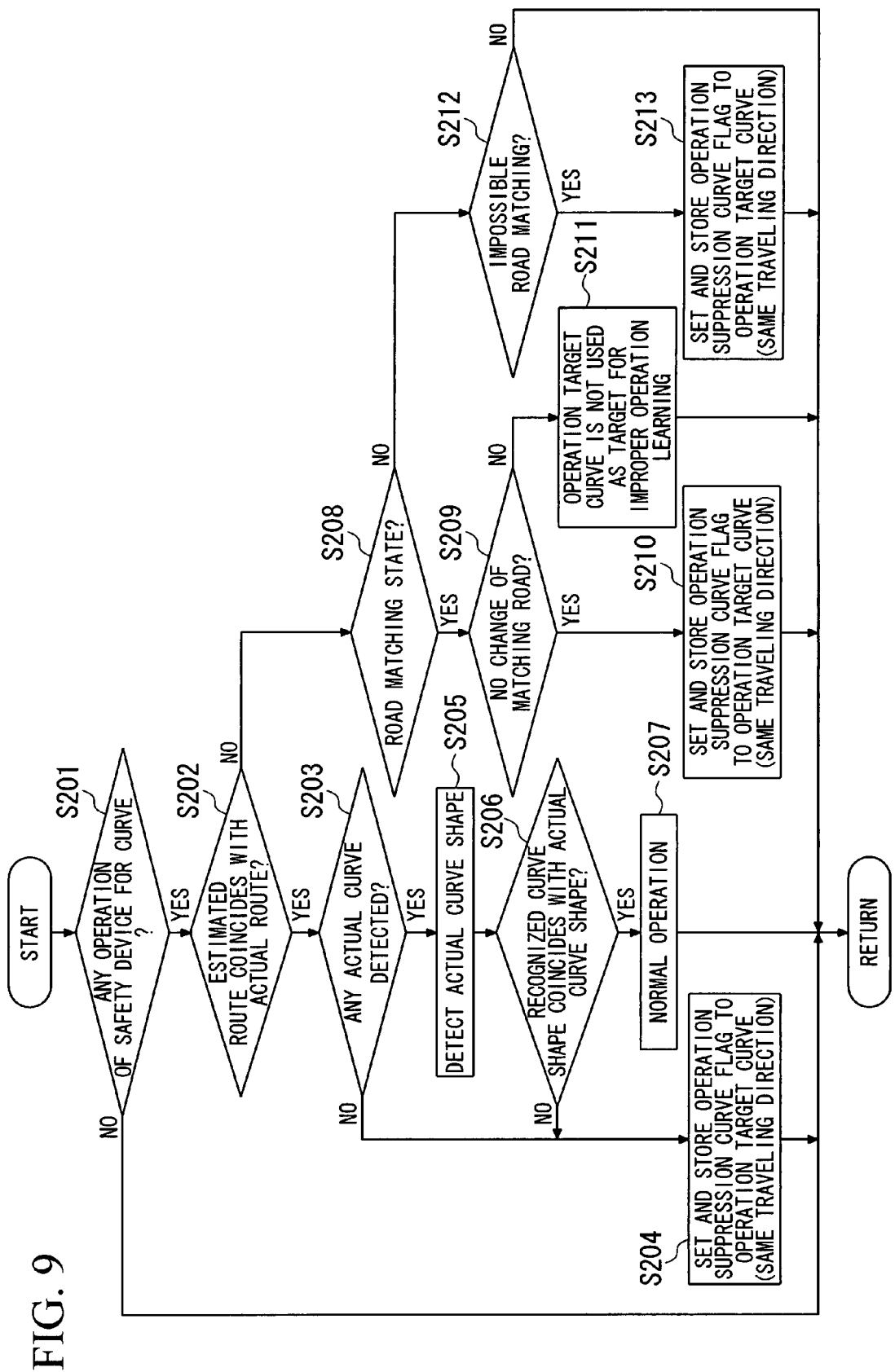
FIG. 9 is a flow chart of improper operation learning processing in the traveling safety device for a vehicle.

Next, improper operation learning processing (operation suppression curve flag setting processing) will be described with reference to the flow chart of FIG. 9. In addition, an improper operation learning processing routine shown in the flow chart of FIG. 9 is repeatedly executed at every fixed time interval by the control device (not shown).

First, in Step S201, it is estimated whether or not the safety device 21 has been operated for the recognized curve.

If the determination result in Step S201 is "NO" (non-operation), execution of this routine is once completed.

If the determination result in Step S201 is "YES" (operation), the process proceeds to Step S202 where it is determined whether or not the estimated route and the actual route coincide with each other (on-route state).

If the determination result in Step S202 is "YES" (correspondence: on-route state), the process proceeds to Step S203 where it is determined whether or not an actual curve has been detected.

If the determination result in Step S203 is "NO" (non-detection of an actual curve), the process proceeds to Step S204 where a traveling direction is specified for a curve (hereinafter referred to as an operation target curve) serving as a target for the operation of the safety device 21, and then an operation suppression curve flag is set and stored, thereby once completing execution of this routine. This is erroneous curve recognition, and corresponds to the case of FIG. 2A.

If the determination result in Step S203 is "YES" (detection of an actual curve), the process proceeds to Step S205 where the shape of the detected actual curve is detected.

Then, the process proceeds from Step S205 to Step S206 where it is determined whether or not the shape of the recognized curve shape has coincided with the shape of the actual curve shape.

If the determination result in Step S206 is "YES" (correspondence), the process proceeds to Step S207 where it is determined that the operation of the safety device 21 for the recognized curve is normal (normal system operation), and then execution of this routine is once completed.

If the determination result in Step S206 is "NO" (non-correspondence), the process proceeds to Step S204 where a traveling direction is specified for an operation target curve, and then an operation suppression curve flag is set and stored, thereby once completing execution of this routine. This is also erroneous curve recognition, and corresponds to the case of FIG. 2A (erroneous curve recognition).

On the other hand, if the determination result in Step S202 is "NO" (non-correspondence between the estimated route and the actual route mismatching: off-route state), the process proceeds to Step S208 where it is determined whether or not the current position of the present vehicle is located on a road corresponding to road data, i.e., in a road matching state.

If the determination result in Step S208 is "YES" (road matching state), the process proceeds to Step S209 where it is determined whether or not there is any change in a matching route.

If the determination result in Step S209 is "YES" (no change), the process proceeds to Step S210 where a traveling direction is specified for an operation target curve, and then an operation suppression curve flag is set and stored, thereby once completing execution of this routine. This is considered to be a case where a vehicle travels along fork routes other than an estimated route, and, corresponds to the case of FIG. 3A.

If the determination result in Step S209 is "NO" (change), the process proceeds to Step S211 where execution of this routine is once completed without using the operation target curve as a target for improper operation learning. That is, in this case, an operation suppression curve flag is not set to the operation target curve. This is considered to be a case where a matching road is wrong due to an error of present vehicle position detection, and corresponds to the case of FIGS. 7A and 7B.

On the other hand, if the determination result in Step S208 is "NO" (no road matching, i.e., off-road state), the process proceeds to Step S212 where it is determined whether or not road matching is impossible.

If the determination result in Step S212 is "YES" (road matching is impossible), the process proceeds to Step S213 where a traveling direction is specified for an operation target curve, and then an operation suppression curve flag is set and stored, thereby once completing execution of this routine. This is considered to be a case where a vehicle travels along a route (for example, new route) that is not in road data, and corresponds to the case of FIG. 5A.

If the determination result in Step S212 is "NO" (road matching is possible), execution of this routine is once completed.

As described above, according to the traveling safety device 10 for a vehicle of the present embodiment, improper operation of the operating unit 20 can be simply and easily learned without performing troublesome processing, such as clarifying factors of improper operation of the operating unit 20 or making additions or changes of road data. Also, as for a curve that became a target for the operation of the curve entering brake assist system, when it was determined that the operation of the safety device 21 by the operating unit 20 was improper operation after passage of the curve, curve entering brake assist can be suppressed if the same curve is recognized on the next estimated route.

In addition, the present invention is not limited to the aforementioned embodiment.

For example, although the aforementioned embodiment has been described that prohibition of the operation of the safety device 21 is adopted as suppression of the operating device by a suppressing device, the operation of the operating device may be suppressed by making the operation of the safety device weaker than normal operation.

While a preferred embodiments of the present invention has been described and illustrated above and it should be understood that this is an exemplary of the present invention and is not to be considered as limiting. Additions, omissions and substitutions, and other modifications can be made without departing from the spirit or scope of the present invention. Accordingly, the present invention is not to be considered as being limited by the foregoing description, and is only limited by the scope of the appended claims.

What is claimed is:

1. A traveling safety device for a vehicle, comprising:
a storage device that stores a road data;
a present vehicle position detecting device that detects a position of a present vehicle;
a vehicle state detecting device that detects a vehicle state of the present vehicle;
a curve recognizing device that recognizes a shape of a curve that exists in a traveling direction of the present vehicle based on the road data stored by the storage device;
a proper vehicle state setting device that sets, based on the shape of a recognized curve that is a curve recognized by the curve recognizing device, a proper vehicle state where the vehicle is able to properly pass through the recognized curve;
a comparing device that compares the vehicle state detected by the vehicle state detecting device with the proper vehicle state set by the proper vehicle state setting device;
an operating device that operates a safety device provided in the present vehicle if the vehicle state of the present vehicle is not the proper vehicle state based on a comparison result by the comparing device;
an improper operation determining device that determines whether or not the operation of the operating device for the recognized curve is improper operation;
an improper operation curve storage device that stores, for current use and further use, the recognized curve for which the operation of the operation device is determined to be improper operation by the improper operation determining device; and
a suppressing device that suppresses the operation of the operating device for the recognized curve stored by the improper operation curve storage device,
wherein if the present vehicle has passed through a curve stored in the improper operation curve storage device, an improper operation memory for the curve stored in the improper operation curve storage device is erased.

2. The traveling safety device according to claim 1, further comprising:
- a route estimating device that estimates a route of the present vehicle based on at least the road data stored in the storage device; and
- an estimated route passage determining device that determines whether or not the route estimated by the route estimating device corresponds with an actual traveling road, wherein
- the improper operation determining device determines that the operation of the operating device is improper operation if it is determined that the route estimated by the estimated route passage determining device does not correspond with the actual traveling road, after the operation of the operating device.

3. The traveling safety device according to claim 2, further comprising an actual curve detecting device that detects a curve on the actual road from a vehicle traveling state, wherein
- the improper operation determining device determines that the operation of the operating device is improper operation if it is determined that the route estimated by the estimated route passage determining device corresponds with an actual traveling road, and any curve is not detected on the actual road by the actual curve detecting device, after the operation of the operating device.

4. The traveling safety device according to claim 1, further comprising a matching determining device that determines whether or not the present vehicle is traveling on a road corresponding to the road data based on the road data stored in the storage device and an output from the present vehicle position detecting device, wherein
- the improper operation determining device determines that the operation of the operating device is improper operation if the matching determining device has determined that the present vehicle is not traveling on the road corresponding to the road data, after the operation of the operating device.

5. The traveling safety device according to claim 4, wherein
- the improper operation determining device does not perform improper operation determination for the recognized curve if the matching determining device has determined that the present vehicle is traveling on a road corresponding to road data that is different from an estimated route, after the operation of the operating device.

6. The traveling safety device according to claim 1, wherein
- the improper operation curve storage deice additionally stores a traveling direction in which the safety device has been operated; and
- the suppressing device suppresses the operation of the operating device if the stored traveling direction, and the traveling direction of the present vehicle are the same.

\* \* \* \* \*